May 12, 1925.
H. C. DÉ WEESE
PULVERIZER
Filed Aug. 8, 1923
1,537,418
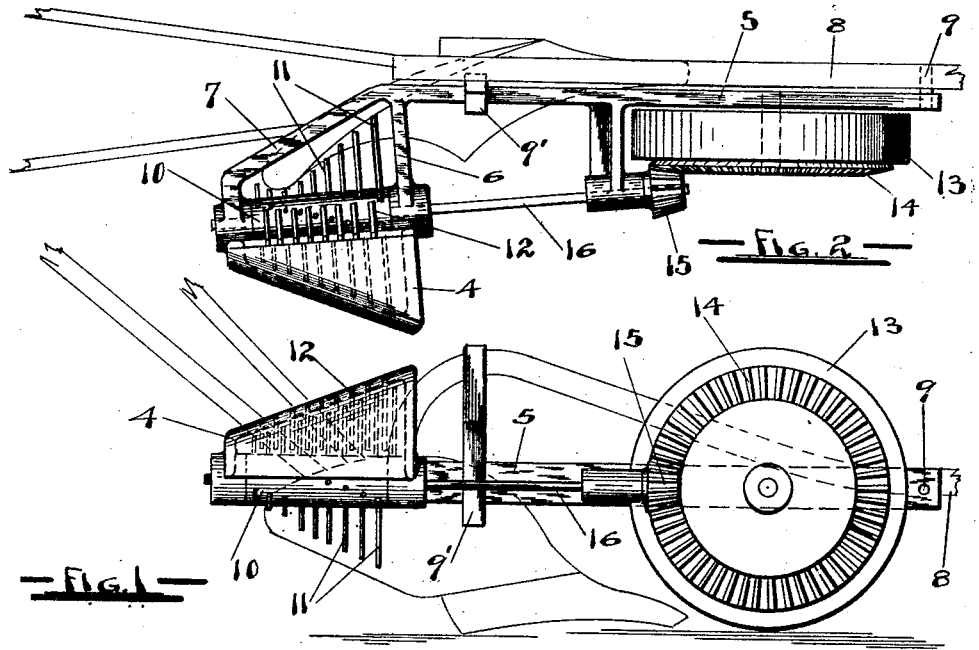
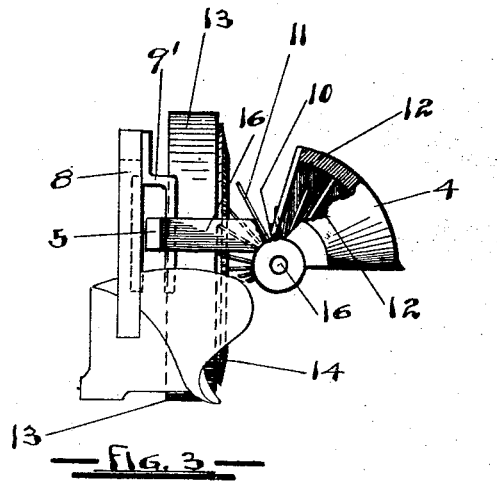
INVENTOR
HENRY C. DeWEESE
BY C. F. Blake
Atty.

Patented May 12, 1925.

1,537,418

UNITED STATES PATENT OFFICE.

HENRY C. DÉ WEESE, OF PORTLAND, OREGON.

PULVERIZER.

Application filed August 8, 1923. Serial No. 656,464.

*To all whom it may concern:*

Be it known that I, HENRY C. DÉ WEESE, a citizen of the United States, and a resident of Portland, county of Multnomah, State of Oregon, have invented certain new and useful Improvements in Pulverizers, of which the following is a specification.

My invention relates to pulverizers in general, and particularly to pulverizers adapted for agricultural use in preparing seed beds. The object of my invention is to provide such a device adapted for attachment to a plow, and which will pulverize the dirt as it issues from the mold board of the plow and deposit such pulverized dirt, thus leaving a thoroughly prepared seed bed behind the plow.

I accomplish the above object by means of the construction illustrated in the accompanying drawing, which is a part of this application for Letters Patent, like characters of reference indicating like parts throughout the several views thereof, and in which:

Fig. 1 is a side elevation of my device attached to a plow.

Fig. 2 is a plan view of the same.

Fig. 3 is a rear elevation of the same, with portions broken away to better illustrate the construction.

In general my device consists of a housing adjacent the mold board of the plow and having substantially depending teeth therein, a toothed cylinder rotating within said housing, the teeth of which cylinder pass between the teeth upon said housing, and means to rotate said cylinder.

The housing 4 is secured to or made integral with an arm 5 by means of arms 6 and 7, the arm 5 being pivotally mounted upon the plow beam 8 at a forward point 9. The rearward portion of the arm 5 and the housing 4 are thus allowed a vertical movement in an arc about the pivotal point 9. To guide the arm 5 and the housing 4 in their vertical movement, I provide suitable guide 9' secured to the plow beam and embracing the arm 5.

Within the housing 4 is rotatably mounted a cylinder or drum 10 having a plurality of series of radial teeth 11, the teeth respective to each series being of varying lengths, so that the ends of all the teeth just clear the mold board of the plow as shown in Fig. 2. The teeth 12 within the housing 4 are substantially radially disposed, and there may be a plurality of series of said teeth, as shown in Fig. 3. The teeth 11 upon the drum pass respectively between the teeth 12 within the housing.

To rotate the drum 10 I provide a drive wheel 13 rotatably mounted upon the arm 5, and bearing a gear 14 which meshes with a pinion 15, which pinion is secured upon the shaft 16 upon which the drum 10 is also secured. The wheel 13 is adapted to contact with the ground and thus operate my device as the plow is propelled.

To expel sticks, stones and the like which may be elevated with the dirt as it mounts the mold board, I dispose the outer series of teeth 12 upon the housing in an inclined position, not radial, as shown in Fig. 3, and the series of teeth 11 upon the drum 10 I dispose in spirals upon the drum, as shown in Figs. 1 and 2. By means of this relative disposal of the coacting teeth of the housing and the drum, such sticks or stones as are elevated with the dirt are worked towards the rear of the housing and there thrown out.

By means of this device only one operation is required to provide a finely pulverized seed bed, that of plowing, as my device pulverizes the dirt as it leaves the plow, and deposits the pulverized dirt in a substantially smooth and level bed.

My device may be made of any size, and constructed of any materials deemed convenient and suitable for a device of this character, and while I have illustrated and described a form of construction and arrangement of parts found desirable in materializing my invention, I wish to include in this application all mechanical equivalents and substitutes that may fairly be considered to come within the scope and purview of my invention as defined in the appended claims.

Having disclosed my invention so that others may be enabled to construct and to use the same, what I claim as new, and desire to secure by Letters Patent is:

1. In a pulverizer adaptable to a plow; a housing adjacent the mold board of the plow and positioned longitudinally of the mold board; substantially depending teeth within said housing; a cylinder rotatably mounted within said housing and positioned longitudinally of the mold board; a plurality of spirally mounted series of teeth upon said cylinder adapted to pass between adjacent teeth upon said housing as said cylinder rotates, said cylinder teeth being of various lengths so that each tooth just clears the mold board of the plow as it rotates with said cylinder; and means to rotate said cylinder.

2. In a pulverizer for a plow; an arm pivotally mounted upon the plow and extending rearwardly from the pivotal mounting point; a housing upon said arm positioned adjacent and longitudinal of the mold board of the plow; inwardly projecting teeth within said housing; a shaft mounted within said housing; a pinion upon said shaft; a gear mounted upon said arm and meshing with said pinion; a drive wheel attached to said gear; a cylinder mounted upon said shaft within said housing longitudinally of the mold board; and a plurality of series of teeth spirally mounted upon said cylinder.

In testimony whereof I claim the foregoing as my own I hereunto affix my signature in the presence of two witnesses at Portland, county of Multnomah, State of Oregon, this 10th day of Jan., 1923.

HENRY C. DÉ WEESE.

Witnesses:
L. J. ROBINSON,
C. F. BLAKE.